(12) United States Patent
Shelby et al.

(10) Patent No.: US 7,565,793 B2
(45) Date of Patent: Jul. 28, 2009

(54) GAS TURBINE ENGINE FUEL CONTROL SYSTEM HAVING START / BACK UP CHECK VALVE (SBUC) PROVIDING A MAIN FUEL CHECK VALVE FUNCTION

(75) Inventors: Jeffrey Dugan Shelby, Mishawaka, IN (US); Paul W. Futa, Jr., North Liberty, IN (US); George S. Wieger, Niles, MI (US)

(73) Assignee: Honeywell International Inc., Morristown, NJ (US)

( * ) Notice: Subject to any disclaimer, the term of this patent is extended or adjusted under 35 U.S.C. 154(b) by 671 days.

(21) Appl. No.: 11/362,004

(22) Filed: Feb. 27, 2006

(65) Prior Publication Data

US 2007/0199301 A1 Aug. 30, 2007

(51) Int. Cl.
*F02C 7/22* (2006.01)
(52) U.S. Cl. ............... 60/39.463; 60/734; 137/625.4
(58) Field of Classification Search ............. 60/39.281, 60/39.463, 734; 137/511, 512, 513, 625.4
See application file for complete search history.

(56) References Cited

U.S. PATENT DOCUMENTS

| | | | |
|---|---|---|---|
| 2,311,851 A * | 2/1943 | McClure | 137/113 |
| 2,761,463 A * | 9/1956 | Wagner | 137/112 |
| 2,968,348 A * | 1/1961 | Fortmann | 60/39.281 |
| 3,705,602 A * | 12/1972 | Nordin et al. | 137/512 |
| 4,473,999 A | 10/1984 | Smith | |
| 5,020,315 A | 6/1991 | Leachman, Jr. et al. | |
| 5,772,182 A | 6/1998 | Stambaugh, Sr. et al. | |
| 6,158,208 A | 12/2000 | Hommema | |
| 6,272,843 B1 | 8/2001 | Schwamm | |
| 6,381,946 B1 | 5/2002 | Wernberg et al. | |
| 6,401,446 B1 | 6/2002 | Gibbons | |
| 2006/0266047 A1 * | 11/2006 | Eick et al. | 60/734 |

* cited by examiner

*Primary Examiner*—Louis J Casaregola
(74) *Attorney, Agent, or Firm*—Ingrassia Fisher & Lorenz, P.C.

(57) ABSTRACT

A fuel control system (10) for a gas turbine engine includes a main fuel inlet line (18), an auxiliary fuel inlet line (20) and an engine fuel outlet line (16). A first flow path extends from the main fuel inlet line (18) to the engine fuel outlet line (16) and a second flow path extends from the auxiliary fuel inlet line (20) to the engine fuel outlet line (16). A check valve (22) in the first flow path allows fuel flow through the first flow path in a direction from the main fuel inlet line (18) to the engine fuel outlet line (16) and substantially prevents fuel flow through the first flow path in a direction from the engine fuel outlet line (16) to the main fuel inlet line (18). The check valve (22) is shiftable between a first position connecting the auxiliary fuel inlet (20) to the engine fuel outlet (16) and a second position blocking the second flow path. Also a method of controlling fuel flow in a fuel control system of a gas turbine engine.

14 Claims, 5 Drawing Sheets

OFF / START MODE

OFF / START MODE

NORMAL OPERATION MODE

BACKUP MODE

GAS TURBINE ENGINE FUEL CONTROL SYSTEM HAVING START / BACK UP CHECK VALVE (SBUC) PROVIDING A MAIN FUEL CHECK VALVE FUNCTION

FIELD OF THE INVENTION

The present invention is directed toward a gas turbine engine fuel system having main and auxiliary fuel supplies and a selector valve for selecting a fuel supply, and, more specifically, toward a gas turbine engine fuel system having main and auxiliary fuel supplies and a selector valve for selecting a fuel supply, where the selector valve functions as a check valve for checking flow to the unselected fuel supply.

BACKGROUND OF THE INVENTION

Gas turbine engines may be provided with main and auxiliary fuel supplies for supplying fuel to the engine via an engine fuel line. Although not limited to gas turbine engines for aircraft, the following discussion will generally be directed to such engines. The main fuel supply is generally provided by a main fuel pump driven by the gas turbine engine. The auxiliary fuel supply may be provided by an auxiliary pump, such as a variable displacement pump, that may be used for supplying fuel to other devices after engine startup. The auxiliary pump is used during engine start up before the engine has reached operating speed, and is also used to provide a back up fuel supply in the event of a problem with the main fuel supply. In addition, under some operating conditions, such as during stationary take-off/vertical landing (STOVL) or during other critical maneuvers it is important to reduce the risk of fuel supply interruption. At these times, both the main fuel supply and auxiliary fuel supply may be simultaneously connected to the engine fuel line to better ensure a quick switch from one fuel supply to the other if one of the fuel supplies should fail.

A portion of a conventional fuel control system is illustrated in FIG. 5 which includes a main fuel pump 200, an auxiliary fuel pump 202, an engine fuel outlet line 204 carrying fuel toward an engine (not shown), a main fuel inlet line 206 carrying fuel from main fuel pump 200 to engine fuel outlet line 204 and an auxiliary fuel inlet line 208 carrying fuel from auxiliary pump 202 to engine fuel outlet line 204. A main fuel check valve 210 is mounted in a main fuel check valve path 212 parallel to main fuel inlet line 206 such that fuel can flow in a first direction from main fuel pump 200 toward engine fuel outlet line 204 but is substantially blocked from flowing in a direction from engine fuel outlet line 204 toward main fuel inlet line 206.

Auxiliary fuel inlet line 208 includes a valve body 214 comprising a selector valve for determining whether main fuel inlet line 206 or auxiliary fuel inlet line 208 provides fuel to the engine that is slidable between a first position, illustrated in FIG. 5, substantially blocking flow through auxiliary fuel inlet line 208 and a second position, shifted in the direction of arrow 216 in FIG. 5, allowing fuel to flow from auxiliary fuel inlet line 208 to engine outlet line 204 through the center portion of the valve body 214. A spring 215 biases valve body 214 toward the first position. As will be appreciated from FIG. 5, valve body 214 is shifted into the position illustrated in FIG. 5 when pressure in main fuel inlet line 206 overcomes the force of spring 215 applied against valve body 214. A pressure limiting valve 218 is located in auxiliary fuel inlet line 208 between valve body 214 and engine fuel outlet line 204 for limiting the pressure of fuel entering engine fuel outlet line 204 from auxiliary fuel inlet line 208.

An auxiliary fuel bypass line 220 extends from a first point 222 in auxiliary fuel inlet line 208 upstream of valve body 214 to a second point 224 in auxiliary fuel inlet line 208 downstream of valve body 214 to bypass valve body 214. An electrohydraulic servovalve 226 includes a second stage spool 228 in auxiliary fuel bypass line 220 and controllably opens and closes the auxiliary fuel bypass line 220.

On engine start-up, main fuel pump 200 does not supply sufficient fuel for engine operation, and therefore auxiliary fuel pump 202 pumps fuel through auxiliary fuel inlet line 208 to valve body 214. A spring shifts the valve body open against the lower pressure of fuel in main fuel inlet line 206 so that fuel can flow to engine fuel inlet 204 and to the engine. The increased pressure in engine fuel outlet line 204 relative to check valve path 212 further biases check valve 210 toward its closed position. After start up, when main fuel pump 200 begins supplying fuel to main fuel inlet line 206 at an adequate rate, the pressure in main fuel inlet line 206 increases and forces check valve 210 open and valve body 214 into the position shown in FIG. 5 substantially blocking fuel flow from auxiliary fuel inlet line 208. Auxiliary pump 202 maintains pressure in auxiliary fuel inlet line 208, and, if main pump 200 fails or pressure in main fuel inlet line 206 falls for other reasons, spring 215 biases valve body 214 in the direction of arrow 216 to open a flow path from auxiliary fuel inlet line 208 to engine fuel outlet line 204 so that the supply of fuel to the engine is not interrupted.

If pressure in the main fuel inlet line drops, as described above, auxiliary fuel will be provided from the auxiliary fuel inlet line 208. However, under some operating conditions it is desirable to minimize delay in this switch from one fuel system to the other and therefore the fuel supply is operated in the configuration illustrated in FIG. 5. In this configuration, valve body 214 is positioned to block fuel the auxiliary fuel flow from auxiliary fuel inlet 208; however, spool 228 is positioned to open auxiliary fuel bypass line 220 so that an auxiliary fuel flow can bypass valve body 214 and flow into engine fuel outlet 204 via pressure limiting valve 218. Because the pressure from main fuel inlet line 206 is greater than the pressure of fuel exiting pressure limiting valve 218, main fuel check valve 210 remains open even when fuel is provided from two sources in this manner. This arrangement helps ensure a continuous fuel supply even if one of the two fuel systems fails.

The above described system functions adequately for its intended purpose. However, when designing fuel systems for gas turbine engines, especially when these engines are used on aircraft, it is generally desirable to reduce the weight of the fuel system. It would therefore be desirable to provide a gas turbine engine fuel supply system that operates in the start up, normal, backup and combined modes described above but that weighs less than a conventional system.

SUMMARY OF THE INVENTION

This problem and others are addressed by the present invention which comprises, in a first aspect, a fuel control system for a gas turbine engine that includes a main fuel inlet line, an auxiliary fuel inlet line and an engine fuel outlet line. A first flow path extends from the main fuel inlet line to the engine fuel outlet line and a second flow path extends from the auxiliary fuel inlet line to the engine fuel outlet line. A check valve in the first flow path allows fuel flow through the first flow path in a direction from the main fuel inlet line to the engine fuel outlet line and substantially prevents fuel flow through the first flow path in a direction from the engine fuel outlet line to the main fuel inlet line. The check valve is shiftable between a first position connecting the auxiliary fuel inlet to the engine fuel outlet and a second position blocking the second flow path.

Another aspect of the invention comprises a fuel control system for a gas turbine engine that includes a main fuel inlet line, an auxiliary fuel inlet line, a valve sleeve connecting the main fuel inlet line to the auxiliary fuel inlet line and an engine fuel outlet line. A valve body is slidably mounted in the valve sleeve, and the valve body is shiftable from a first position allowing fluid flow from the auxiliary fuel inlet line to the engine fuel outlet line and substantially blocking fluid flow from the engine fuel outlet line to the main fuel inlet line, and a second position substantially blocking fuel flow from the auxiliary fuel inlet line to the engine fuel outlet line. The valve body is shiftable from the first position to the second position when a fuel pressure in the main fuel inlet line increases above a pressure on a side of the valve body opposite the main fuel inlet line.

An additional aspect of the invention comprises a fuel control system for a gas turbine that includes a main fuel inlet line, an auxiliary fuel inlet line and an engine fuel outlet line with a first flow path from the main fuel inlet line to the engine fuel outlet line and a second flow path from the auxiliary fuel inlet line to the engine fuel outlet line. A check valve is provided in the first flow path having a bore and a selector section extending into the second flow path and allowing fuel flow through the first flow path in a direction from the main fuel inlet line to the engine fuel outlet line and substantially preventing fuel flow through the first flow path in a direction from the engine fuel outlet line to the main fuel inlet line, the check valve being shiftable from a first position connecting the auxiliary fuel inlet line to the engine fuel outlet line to a second position blocking the second flow path when a fuel pressure in the main fuel inlet line increases above a pressure in the auxiliary fuel inlet line by a given amount. A biasing mechanism for biasing the check valve toward the first position is provided. An auxiliary fuel bypass line connects to the auxiliary fuel inlet line, and a control valve selectively connects the auxiliary fuel inlet line to the engine fuel outlet line via the auxiliary fuel bypass line. A return pressure line has an opening wherein the bore is aligned with the return pressure line opening when the check valve is in the first position thereby connecting the main fuel inlet line to the return pressure line, and the bore is not aligned with the return pressure line opening when the check valve is in the second position.

BRIEF DESCRIPTION OF THE DRAWINGS

These and other aspects of the invention will be better understood after a reading of the following detailed description together with the following drawings wherein.

DETAILED DESCRIPTION

Figure 1:
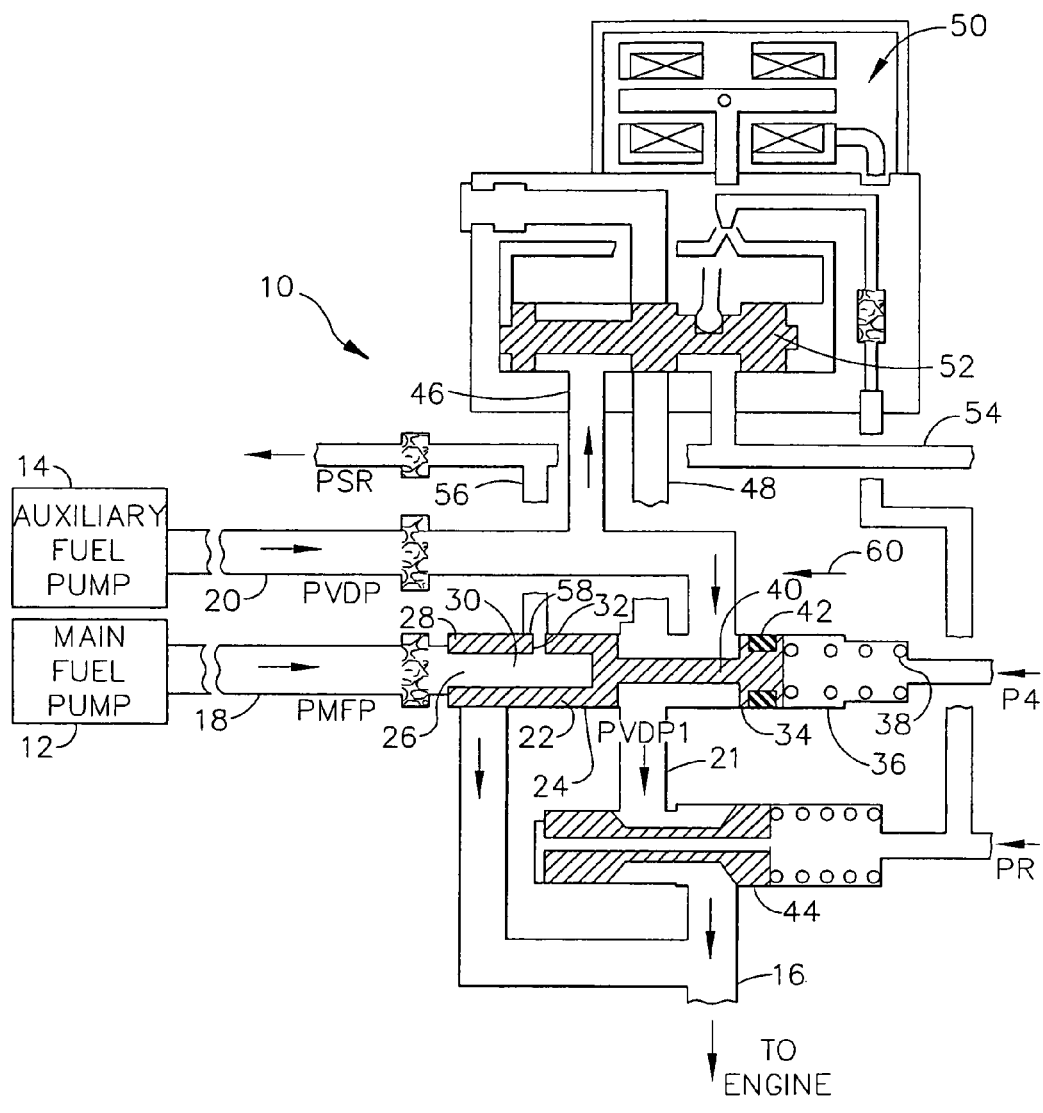
FIG. 1 is a schematic view of a fuel control system for a gas turbine engine according to an embodiment of the present invention configured for operation in a start-up mode.

Referring now to the drawings, wherein the showings are for the purpose of illustrating a presently preferred embodiment of the invention only and not for the purpose of limiting same, FIGS. 1-4 illustrate a fuel control system according to an embodiment of the present invention in four operating states. Illustrated in these figures is a fuel control system 10 including a main fuel pump 12, an auxiliary fuel pump 14 and an engine outlet fuel line 16. Main fuel pump 12 provides fuel under pressure to engine outlet fuel line 16 via a main fuel inlet line 18, and auxiliary fuel pump 14 provides fuel under pressure to engine fuel outlet fuel line 16 via an auxiliary fuel inlet line 20. Passageway 24 connects main fuel inlet line 18 to auxiliary fuel inlet line 20; however flow from main fuel inlet line 18 to auxiliary fuel inlet line 20 is substantially prevented by a valve body 22 slidably mounted in the valve sleeve formed in part by passageway 24.

Valve body 22 includes an open first end 26 comprising a cylindrical wall 28 surrounding an interior 30 and including a bore 32 through wall 28, and a second end 34 slidably mounted in a passage 36 forming an extension of passageway 24 in a direction away from main fuel inlet line 18. A spring 38 in passage 36 biases valve body 22 in the direction from second end 34 toward first end 26. Valve body 22 includes a reduced diameter central portion 40 that allows fuel to flow from auxiliary fuel inlet line 20 to engine fuel outlet line 16 by way of passage 21 when auxiliary fuel inlet line 20 and passage 21 are open to central portion 40 as described below. A seal 42 substantially prevents fluid flow between passage 36 and central portion 40, and therefore the pressure of fluid in passage 36 can be adjusted to affect the position of valve body 22. A pressure limiting valve 44 downstream of valve body 22 in auxiliary fuel inlet line 16 limits the pressure of fuel entering engine fuel outlet line 16 from auxiliary fuel inlet line 20.

Fuel control system 10 also includes a bypass subsystem for selectively providing fuel from auxiliary fuel pump 14 to engine fuel outlet line 16 independently of the position of valve body 22. This subsystem includes a first branch line 46 off auxiliary fuel inlet line 20, a bypass line 48 extending from engine fuel outlet line 16, and an electrohydraulic servo valve (EHSV) 50 having a spool 52 for selectively connecting first branch line 46 to bypass line 48. The position of spool 52 is controlled by EHSV 50 in a well known manner and will not be described further herein. Fuel system 10 also includes a servo pressure return line 54 and a servo pressure return branch 56 connecting servo pressure return line 54 to an opening 58 in a wall of passageway 24.

The operation of fuel control system 10 will be described, referring first to FIG. 1, which illustrates the state of the system when the engine is off and during startup. In this mode or configuration, valve body 22 is shifted in the direction of arrow 60, to the left as illustrated in FIG. 1, because the pressure in main fuel inlet line 18 is less than the force exerted against valve second end 34 by the spring 38 and the pressure in passage 36. In addition, EHSV 50 positions spool 52 to block first branch line 46 from bypass line 48 to substantially prevent fuel flow from branch line 46 to bypass line 48. As auxiliary pump 14 begins to pump fuel, the fuel travels through auxiliary fuel inlet line 20 to central portion 40 of valve body 22. With valve body 22 in the position illustrated, a pathway from auxiliary fuel inlet 20 to engine fuel outlet line 16 via passage 21 is opened, and fuel flows to pressure limiting valve 44 and to the engine. Pressure limiting is not required at start up, and pressure limiting valve 44 is shifted in the direction of arrow 60, or to the left, as viewed in FIG. 1, allowing relatively unrestricted fuel flow therepast.

The output of main fuel pump 12 is often related to engine speed, and as engine speed increases, main fuel pump 12 pumps fuel and increases the pressure of the fuel in main fuel pump inlet line 18. As fuel flows from fuel main pump 12, some passes through bore 32 in wall 28 of valve body 22 and into servo pressure return branch 56. However, bore 32 is relatively small, and when the pressure in main fuel inlet line 18 is high enough to overcome the forces biasing valve body 22 in the direction of arrow 60, valve body 22 shifts under the pressure of the fluid in main fuel inlet line 18 in the direction opposite the direction of arrow 60 or to the right as illustrated in the Figures until bore 32 is no longer aligned with opening 56 and valve body 22 reaches the position illustrated in FIG. 2.

Figure 2:
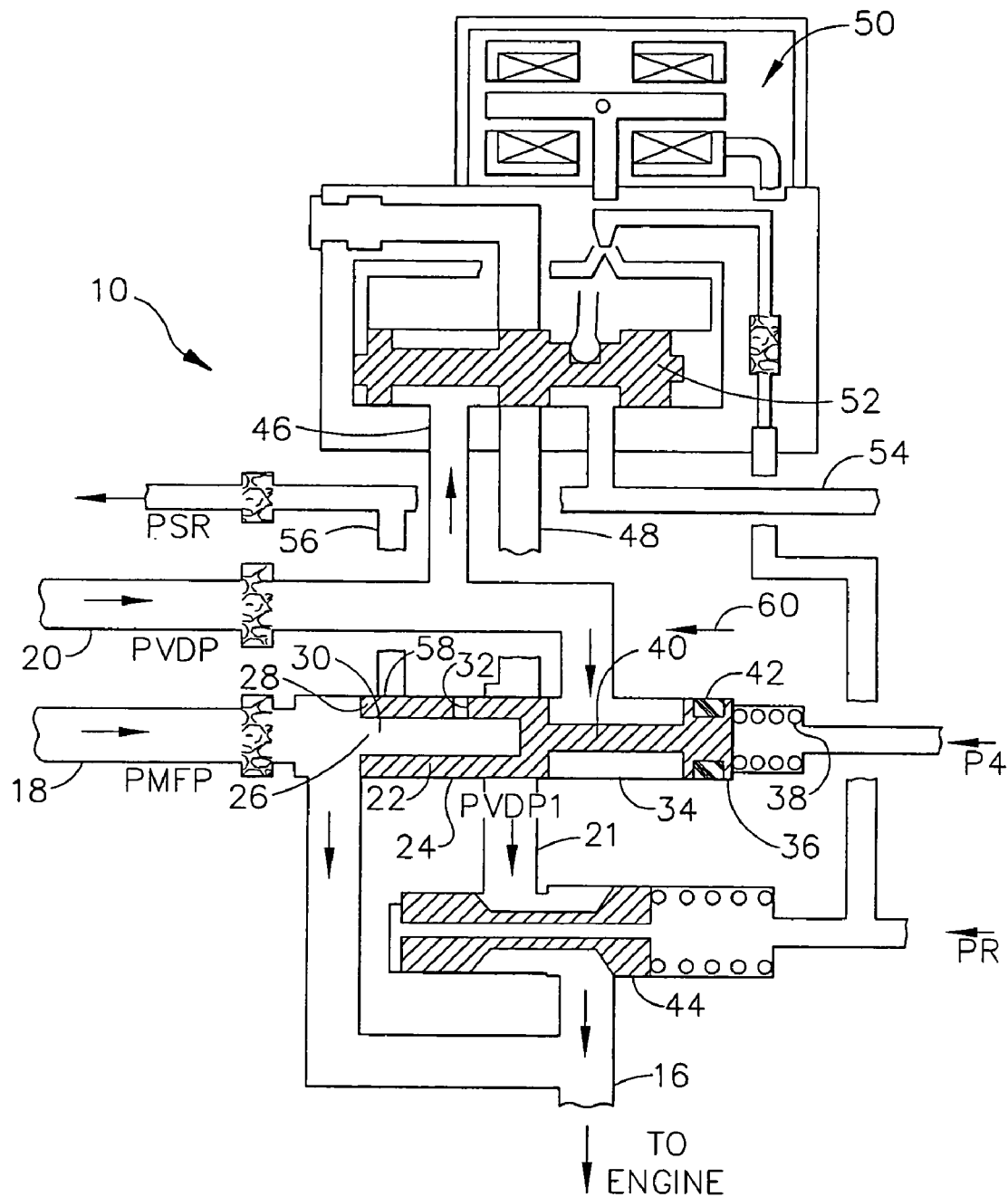
FIG. 2 is a schematic view of the fuel control system of FIG. 1 configured for operation in a normal operation mode.

FIG. 2 illustrates the normal operating mode of the fuel supply system 10 in which fuel is provided to the engine via a flow path from main fuel pump inlet line 18 to engine fuel outlet line 16 through a portion of passageway 24. With valve body 22 in this position, a portion of cylindrical wall 28 blocks passage 21 and substantially prevents fuel from passing from auxiliary fuel inlet line 20 to engine fuel outlet line 16. In addition, spool 52 remains in the position described above substantially preventing (apart from a normal leakage flow) fuel from passing from first branch line 46 to bypass line 48.

Figure 3:
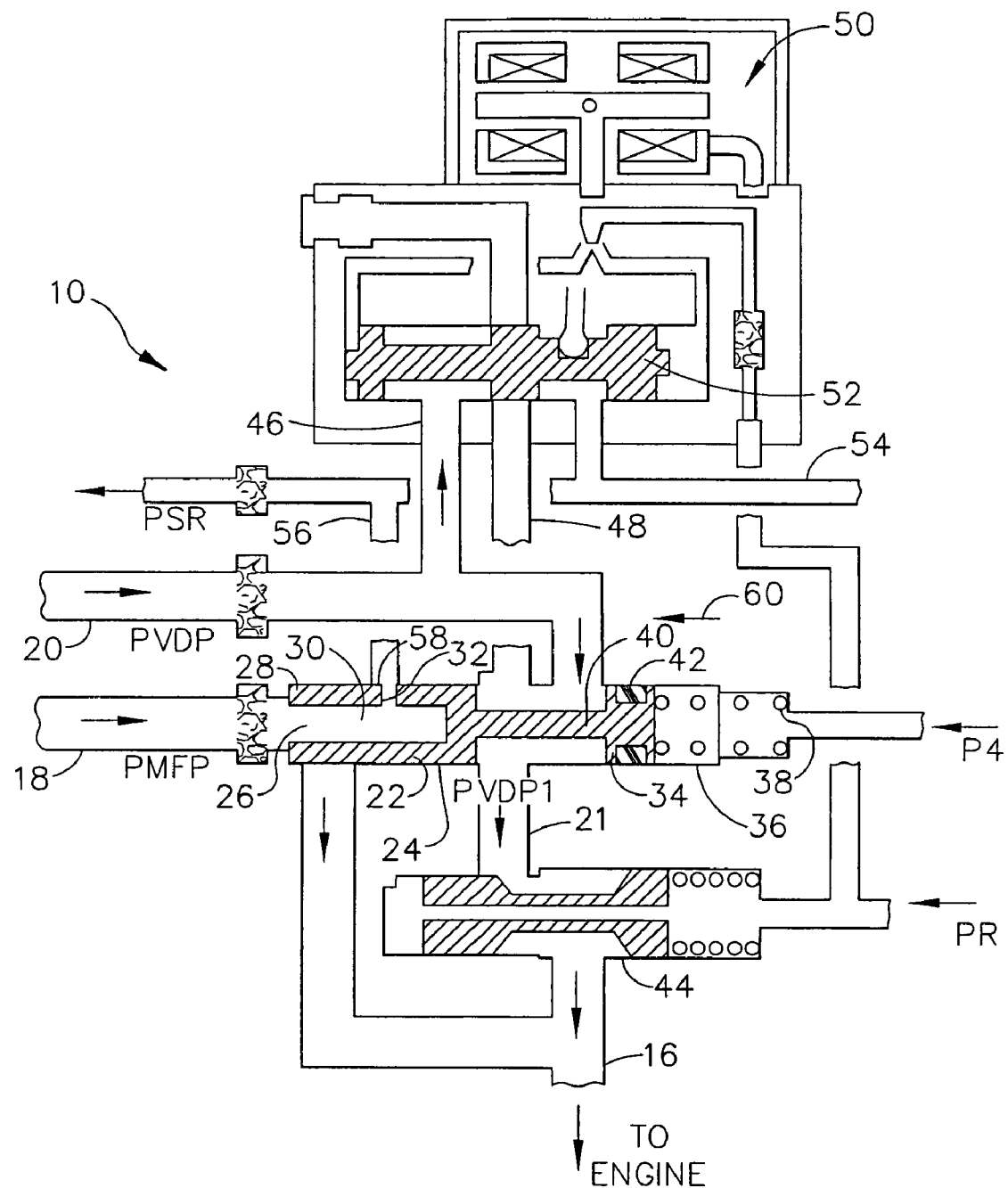
FIG. 3 is a schematic view of the fuel control system of FIG. 1 configured for operation in a back-up mode.
Figure 4:
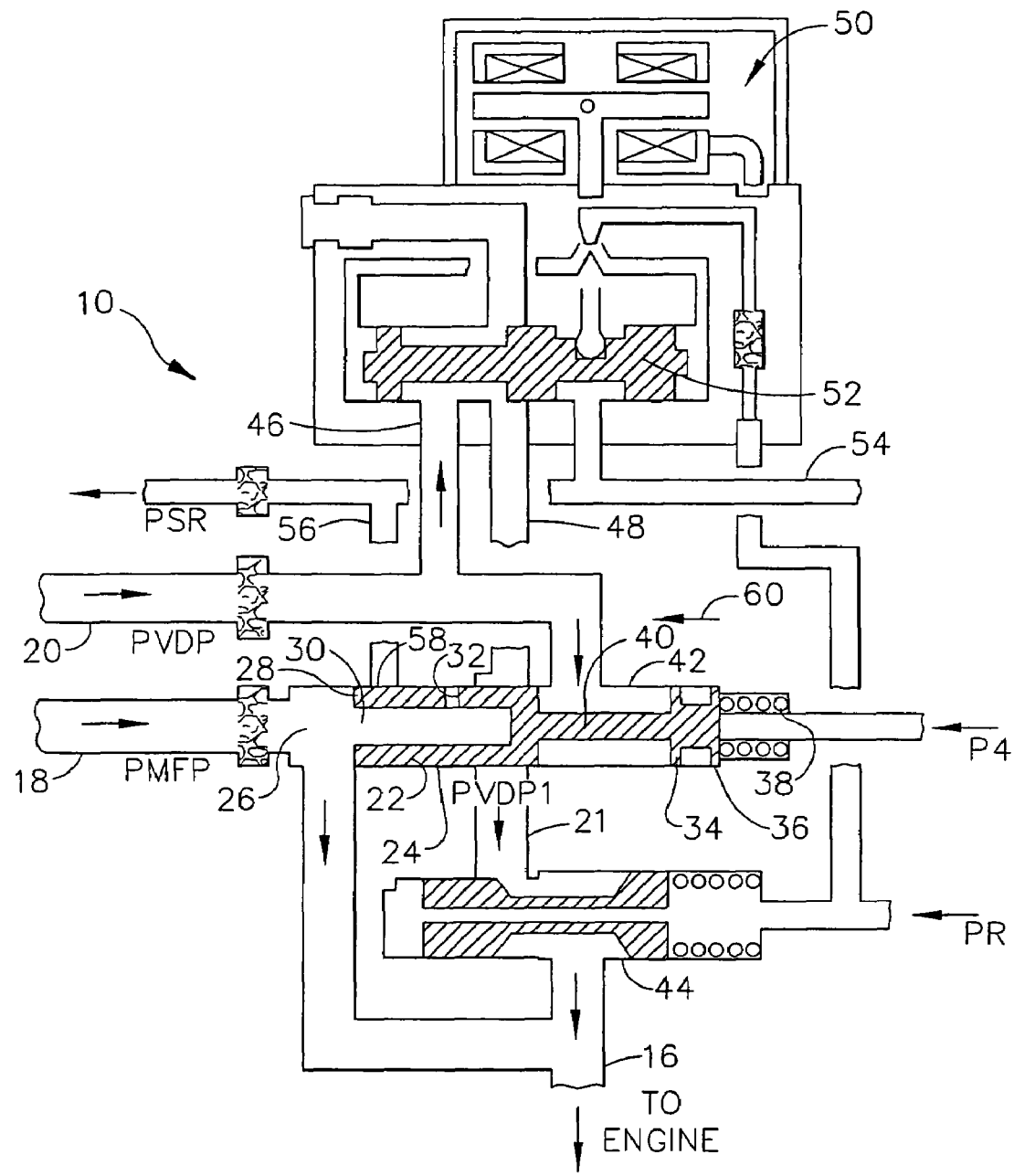
FIG. 4 is a schematic view of the fuel control system of FIG. 1 configured for operation in a critical operations mode.
Figure 5:
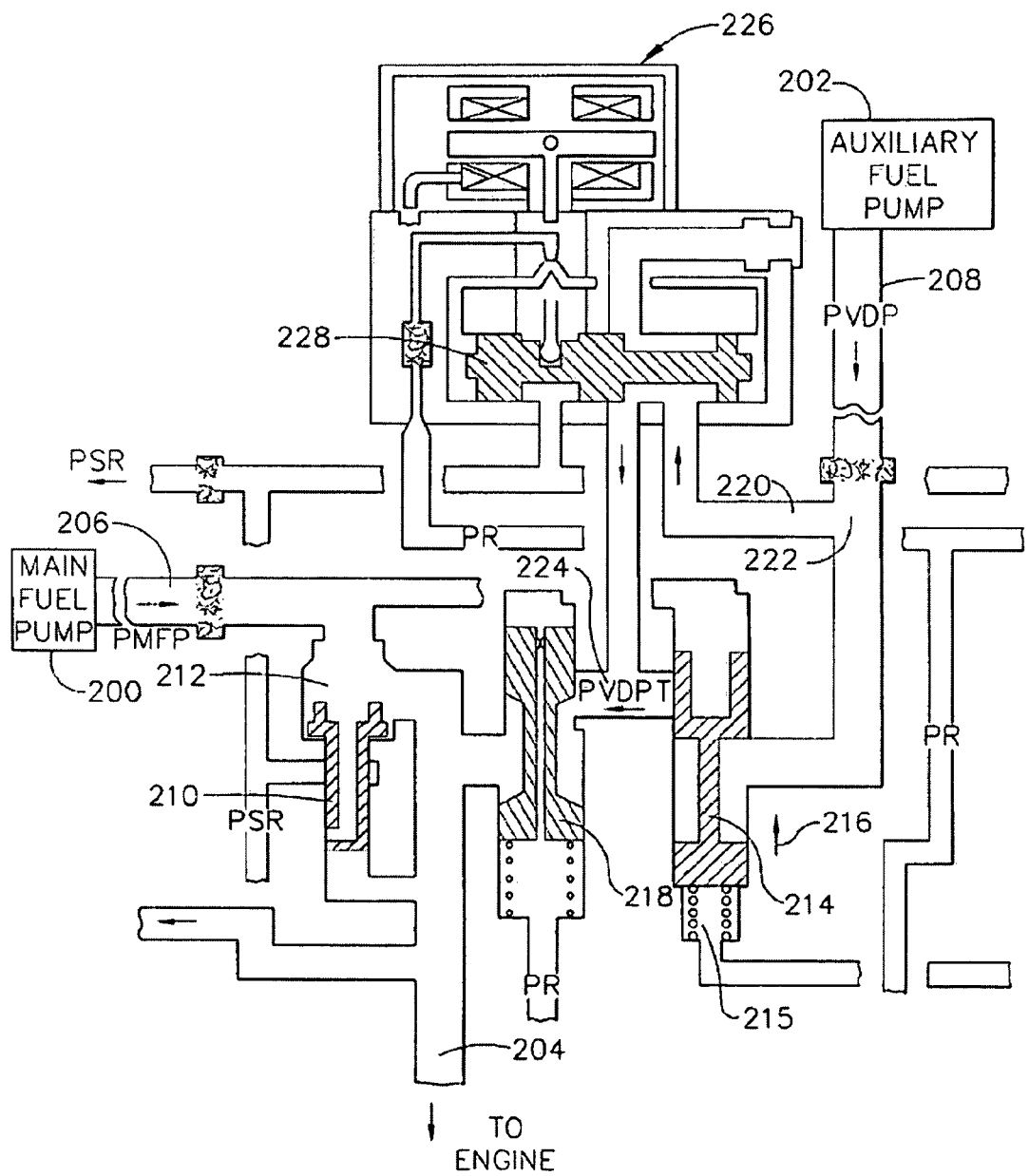
FIG. 5 illustrates a convention fuel control system for a gas turbine engine.

If a problem occurs with main fuel pump 12 or in main fuel inlet line 18, the pressure in main fuel inlet line 18 will drop and valve body 22 will shift in the direction of arrow 60, to the left in the Figures, to the position illustrated in FIG. 3. Similar to the start-up mode illustrated in FIG. 1, fuel is provided to engine fuel outlet line 16 by the auxiliary fuel pump 14 in this configuration. Pressure will also increase in the portion of main fuel inlet line 18 between valve body 22 and engine fuel outlet line 16; however, in this mode, cylindrical wall 28 of valve body 22 forms a check valve and substantially prevents fuel from flowing from engine fuel outlet line 16 to main fuel inlet line 18. Pressure limiting valve 44 is shifted in the direction opposite arrow 60 with respect to its position during startup mode to limit the pressure of the fuel provided by auxiliary pump 14 as needed.

Interruptions in fuel supply are generally undesirable. However, during certain maneuvers, it is especially important to avoid even small fuel pressure losses. When the fuel supply system 10 is operating in the normal mode illustrated in FIG. 2, EHSV can be commanded to shift spool 52 in the direction opposite arrow 60, to the right in the figures, to open a pathway from first branch line 46 to bypass line 48. In this mode, both main fuel pump 12 and auxiliary fuel pump 14 are supplying fuel to the engine, and minor variations in the pressure of fuel supplied by each pump will be less consequential to the engine. In the event of a problem with main fuel pump 12 or main fuel inlet line 18, the shift from main fuel pump 12 to auxiliary fuel pump 14 will occur more rapidly than if the auxiliary flow of fuel were not already being provided via bypass passage 48.

As described above, it will be appreciated that fuel control system 10 controls a fuel supply in a manner similar to that of a conventional fuel control system. However, fuel system 10, which does not include a main fuel check valve 210, should be lighter than a conventional fuel control system by at least several ounces and should reduce the cost of a fuel control system by several hundred dollars without adversely affecting performance.

The present invention has been described herein in terms of a preferred embodiment. However, obvious modifications and additions to this embodiment will become apparent to those skilled in the relevant arts upon a reading and understanding of the foregoing description. It is intended that all such obvious modifications and additions for a part of the present invention to the extent they fall within the scope of the several claims appended hereto.

We claim:

1. A fuel control system for a gas turbine engine, the fuel control system comprising:
    a main fuel inlet line;
    an auxiliary fuel inlet line;
    an engine fuel outlet line;
    a first flow path from said main fuel inlet line to said engine fuel outlet line;
    a second flow path from said auxiliary fuel inlet line to said engine fuel outlet line;
    a check valve in said first flow path allowing fuel flow through the first flow path in a direction from the main fuel inlet line to the engine fuel outlet line and substantially preventing fuel flow through the first flow path in a direction from the engine fuel outlet line to the main fuel inlet line, said check valve being shiftable between a first position connecting said auxiliary fuel inlet line to said engine fuel outlet line and a second position blocking said second flow path;
    an auxiliary fuel bypass line bypassing said check valve and connected to said auxiliary fuel inlet line; and
    a control valve selectively connecting said auxiliary fuel inlet line to said engine fuel outlet line via said auxiliary fuel bypass line.

2. The fuel control system of claim 1 wherein said second flow path extends through the check valve.

3. The fuel control system of claim 1 wherein said check valve in said first position substantially prevents fuel flow from said engine fuel outlet line to said main fuel inlet line.

4. The fuel control system of claim 1 including biasing means for biasing said check valve toward said first position.

5. The fuel control system of claim 1 including a spring biasing said check valve toward said first position.

6. The fuel control system of claim 1 including a control pressure line biasing aid check valve toward said first position.

7. A fuel control system for a gas turbine engine, the fuel control system comprising:
    a main fuel inlet line;
    an auxiliary fuel inlet line;
    an engine fuel outlet line;
    a first flow path from said main fuel inlet line to said engine fuel outlet line;
    a second flow path from said auxiliary fuel inlet line to said engine fuel outlet line;
    a check valve in said first flow path allowing fuel flow through the first flow path in a direction from the main fuel inlet line to the engine fuel outlet line and substantially preventing fuel flow through the first flow path in a direction from the engine fuel outlet line to the main fuel inlet line, said check valve being shiftable between a first position connecting said auxiliary fuel inlet line to said engine fuel outlet line and a second position blocking said second flow path; and
    a return pressure line having an opening wherein said check valve includes a bore aligned with said return pressure line opening when said check valve is in said first position thereby connecting said main fuel inlet line to said return pressure line.

8. The fuel control system of claim 7 wherein said bore is not aligned with said return pressure line opening when said check valve is in said second position.

9. A fuel control system for a gas turbine engine comprising:
    a main fuel inlet line;

an auxiliary fuel inlet line;

an engine fuel outlet line;

a check valve fluidly coupled between the main fuel inlet line, the auxiliary fuel inlet line, and the engine fuel outlet line, the check valve movable between: (i) a first position wherein the check valve substantially blocks fuel flow from the main fuel inlet line to the engine fuel outlet line while generally permitting fuel flow from the auxiliary fuel inlet line to the engine fuel outlet line, and (ii) a second position wherein the check valve substantially blocks fuel flow from the auxiliary fuel inlet line to the engine fuel outlet line while generally permitting fuel flow from the main fuel inlet line to the engine fuel outlet line;

an auxiliary fuel bypass line fluidly coupled between the main fuel inlet line and engine outlet line and bypassing the check valve; and a control valve fluidly coupled to the bypass line, the control valve substantially blocking fuel flow through the auxiliary fuel bypass line in a normal operational mode and generally permitting fuel flow through the auxiliary fuel bypass line in a critical operational mode.

10. The fuel control system of claim 9 wherein said check valve is configured to shift from said second position to said first position when a pressure in said auxiliary fuel inlet line exceeds the pressure in said main fuel inlet line.

11. The fuel control system of claim 9 including a return pressure line having an opening wherein said check valve includes a bore aligned with said return pressure line opening when said check valve is in said first position thereby connecting said main fuel inlet line to said return pressure line.

12. The fuel control system of claim 11 wherein said bore is not aligned with said return pressure line opening when said check valve is in said second position.

13. The fuel control system of claim 9 including a spring biasing said check valve toward said first position.

14. The fuel control system of claim 9 including a control pressure line biasing said check valve toward said first position.

* * * * *